United States Patent
Zhao et al.

(10) Patent No.: US 11,355,922 B2
(45) Date of Patent: Jun. 7, 2022

(54) GROUND FAULT PROTECTION METHOD AND APPARATUS FOR PHOTOVOLTAIC STATION OUTPUT TRANSMISSION LINE

(71) Applicants: STATE GRID ZHEJIANG ELECTRIC POWER CO., LTD. TAIZHOU POWER SUPPLY COMPANY, Zhejiang (CN); STATE GRID CORPORATION OF CHINA, Beijing (CN); NORTH CHINA ELECTRIC POWER UNIVERSITY, Beijing (CN)

(72) Inventors: Ping Zhao, Zhejiang (CN); Fengyuan Wang, Zhejiang (CN); Chi Zhang, Zhejiang (CN); Yuande Zheng, Zhejiang (CN); Yudong Fang, Zhejiang (CN); Hua Xu, Zhejiang (CN); Zaibing Zhou, Zhejiang (CN); Tao Zheng, Zhejiang (CN); Yifan Zhu, Zhejiang (CN); Chenjing Xu, Zhejiang (CN); Tao Zhu, Zhejiang (CN); Kang Wang, Zhejiang (CN); Zhen Huang, Zhejiang (CN); Guode Ying, Zhejiang (CN)

(73) Assignees: STATE GRID ZHEJIANG ELECTRIC POWER CO., LTD. TAIZHOU POWER SUPPLY COMPANY, Zhejiang (CN); STATE GRID CORPORATION OF CHINA, Beijing (CN); NORTH CHINA ELECTRIC POWER UNIVERSITY, Beijing (CN)

( * ) Notice: Subject to any disclaimer, the term of this patent is extended or adjusted under 35 U.S.C. 154(b) by 426 days.

(21) Appl. No.: 16/621,657

(22) PCT Filed: Oct. 10, 2019

(86) PCT No.: PCT/CN2019/110447
§ 371 (c)(1),
(2) Date: Dec. 11, 2019

(87) PCT Pub. No.: WO2020/073970
PCT Pub. Date: Apr. 16, 2020

(65) Prior Publication Data
US 2021/0408781 A1    Dec. 30, 2021

(30) Foreign Application Priority Data
Oct. 10, 2018 (CN) .......................... 201811179365.X (51) Int. Cl.
*H02H 7/00*    (2006.01)
*H02H 7/22*    (2006.01)
(Continued)

(52) U.S. Cl.
CPC ............... *H02H 7/22* (2013.01); *H02H 3/16* (2013.01); *H02J 3/381* (2013.01); *H02J 2300/24* (2020.01)

(58) Field of Classification Search
CPC ... H02H 7/22; H02H 3/16; H02J 3/381; H02J 2300/24; H02J 3/001
See application file for complete search history.

(56) References Cited

U.S. PATENT DOCUMENTS

2020/0341046 A1* 10/2020 Pettissalo ............... H02H 3/343
2021/0083468 A1* 3/2021 Guo ....................... H02H 9/041

FOREIGN PATENT DOCUMENTS

| CN | 106786414 A | 5/2017 |
| CN | 107632239 A | 1/2018 |

(Continued)

OTHER PUBLICATIONS

International Search Report for PCT/CN2019/110447 dated Dec. 30, 2019 with English Translation.

*Primary Examiner* — Adolf D Berhane
*Assistant Examiner* — Afework S Demisse
(74) *Attorney, Agent, or Firm* — Arentfox Schiff LLP (57) ABSTRACT

Provided are a ground fault protection method and apparatus for a photovoltaic station output transmission line. A circuit (Continued)

breaker on a photovoltaic side is controlled by a control element. Whether measured zero sequence impedance on the photovoltaic side of a segment line has a large variation before and after an action of power grid side distance protection is determined, the variation of the measured zero sequence impedance is inputted into the control element, in condition that the variation of the measured zero sequence impedance is less than a setting value, a tripping signal is outputted to the circuit breaker on the photovoltaic side to isolate the fault; and in condition that the variation of the measured zero sequence impedance is greater than the setting value, photovoltaic side distance protection is not started.

10 Claims, 5 Drawing Sheets

(51) Int. Cl.
  *H02H 3/16* (2006.01)
  *H02J 3/38* (2006.01)

(56) References Cited

FOREIGN PATENT DOCUMENTS

| | | |
|---|---|---|
| CN | 107645155 A | 1/2018 |
| CN | 109361199 A | 2/2019 |
| JP | 2011045215 A | 3/2011 |
| WO | 2009012799 A1 | 1/2009 |

* cited by examiner

GROUND FAULT PROTECTION METHOD AND APPARATUS FOR PHOTOVOLTAIC STATION OUTPUT TRANSMISSION LINE

CROSS REFERENCE TO RELATED APPLICATIONS

This application is a United States National Stage Application of co-pending International Patent Application Number PCT/CN2019/110447, filed on Oct. 10, 2019, which claims priority to Chinese patent application No. 201811179365.X, filed on Oct. 10, 2018, the contents of which are incorporated herein by reference in their entirety.

TECHNICAL FIELD

The present application relates to the field of relay protection, for example, to a ground fault protection method for a photovoltaic station output transmission line.

BACKGROUND

As the photovoltaic power generation technology has increasingly wider applications, the protection setting problem of a photovoltaic integrated power distribution network is more urgent, and the selectivity, sensitivity, speed and reliability of relay protection configured according to a conventional system face great challenges. In case of a fault, a photovoltaic station output transmission line is provided with a fault current from a photovoltaic power supply and a traditional large power grid. Due to photovoltaic volatility, the traditional relay protection may have an adaptability problem. After the fault happens to the photovoltaic station output transmission line, a short-circuit current provided by the photovoltaic power supply is much less than a short circuit current provided by the power grid, and therefore influence of transition resistance on photovoltaic side distance protection is amplified. The influence of a weak feedback of the photovoltaic power supply on distance protection is analyzed below.

Figure 1:
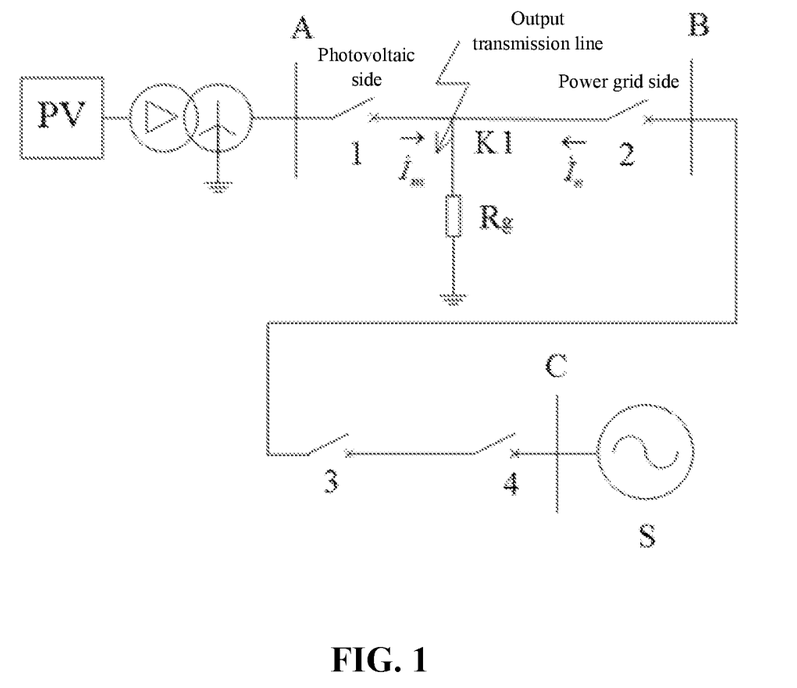
FIG. 1 is a schematic diagram of a 110 kV photovoltaic integrated power distribution network.

As shown in FIG. 1, the fault happens at a point K1 inside the photovoltaic station output transmission line AB, impedance at a protection position 1 is measured as:

$$Z_m = Z_{AK1} + \left(1 + \frac{i_n}{i_m}\right) R_g,$$

where $Z_{AK1}$ denotes positive sequence impedance from bus A to the fault point, $i_n$ and $i_m$ denote the short-circuit current provided by the power grid and the short-circuit current provided by the photovoltaic power supply respectively, and $R_g$ denotes the transition resistance.

Due to the weak feedback of the photovoltaic power supply, a value of $$\frac{i_n}{i_m}$$

is very large, so that a coefficient of the transition resistance is too large, and an error of the measured impedance at the protection position 1 increases, thereby resulting in an incorrect photovoltaic side protection operation.

Protection for the photovoltaic station output transmission line in the related art follows the conventional distance protection configuration scheme and thus may result in the incorrect photovoltaic side protection operation, which may affect stable running of an entire system and cause more severe consequences.

SUMMARY

In a first aspect, the present application provides a ground fault protection method for a photovoltaic station output transmission line, where the photovoltaic station output transmission line includes an output transmission line on a power grid side and an output transmission line on a photovoltaic side. An analysis process of the protection method includes steps described below. Setting impedance and an operation time limit are configured on the power grid side, and in condition that a ground fault happens to the photovoltaic station output transmission line, power grid side distance protection is started. A setting process is performed on the photovoltaic side according to a setting value of a variation of measured zero sequence impedance, protection starting time on the photovoltaic side is configured, whether an operation condition of a photovoltaic side protection position is satisfied is determined, and whether to start photovoltaic side distance protection is determined.

In a second aspect, the present application provides a ground fault protection apparatus for a photovoltaic station output transmission line, where the photovoltaic station output transmission line includes an output transmission line on a power grid side and an output transmission line on a photovoltaic side. The apparatus includes a first control element, a second control element, a first circuit breaker and a second circuit breaker. The first circuit breaker is disposed on the photovoltaic side, the second circuit breaker is disposed on the power grid side, the first control element is electrically connected to the first circuit breaker, and the second control element is electrically connected to the second circuit breaker. The second control element is configured to configure setting impedance and an operation time limit on the power grid side, and in condition that a ground fault happens to the photovoltaic station output transmission line, start power grid side distance protection. The first control element is configured to perform a setting process on the photovoltaic side according to a setting value of a variation of measured zero sequence impedance, determine whether an operation condition of a photovoltaic side protection position is satisfied, determine whether to start photovoltaic side distance protection, and adjust protection starting time on the photovoltaic side. The first circuit breaker is configured to trip in condition that the photovoltaic side distance protection is started. The second circuit breaker is configured to trip in condition that the ground fault happens to the photovoltaic station output transmission line.

DETAILED DESCRIPTION

The present application provides a ground fault protection method for a photovoltaic station output transmission line, where the photovoltaic station output transmission line includes an output transmission line on a power grid side and an output transmission line on a photovoltaic side. An analysis process of the protection method is described below.

Setting impedance and an operation time limit are configured on the power grid side, and in condition that a ground fault happens to the photovoltaic station output transmission line, power grid side distance protection is started.

A setting process is performed on the photovoltaic side according to a setting value of a variation of measured zero sequence impedance, protection starting time on the photovoltaic side is configured, whether an operation condition of a photovoltaic side distance protection position is satisfied is determined, and whether to start photovoltaic side distance protection is determined.

FIG. 1 is a schematic diagram of a 110 kV photovoltaic integrated power distribution network.

1. Power Grid Side Distance Protection

The power grid side distance protection is performed according to a length of a protection line, and the power grid side distance protection includes: setting impedance and operation time limit adjustment.

(a) Setting Impedance

The setting impedance may be configured according to a full length of the protection line and 1.5 times sensitivity, that is: $Z_{set}=1.5\ Z_{AB}$.

$Z_{AB}$ denotes positive sequence impedance corresponding to a full length of the photovoltaic station output transmission line AB, and $Z_{set}$ denotes the setting impedance.

(b) Operation Time Limit $t_0=0$ s, where $t_0$ denotes the operation time limit for the power grid side distance protection.

2. Photovoltaic Side Distance Protection (a) The step of performing the setting process on the photovoltaic side of a photovoltaic station according to the setting value of the variation of the measured zero sequence impedance includes a step described below. Assuming that the measured zero sequence impedance at the photovoltaic side protection position after the ground fault happens and before a circuit breaker on the power grid side trips or an external line of the photovoltaic station output transmission line trips is $Z_0$, the setting value of the variation of the measured zero sequence impedance is set to 10% $Z_0$, that is, $\Delta Z_{0,set}=10\%\ Z_0$.

$\Delta Z_{0,set}$ denotes the setting value of the variation of the measured zero sequence impedance. The photovoltaic side distance protection of the photovoltaic station output transmission line is controlled by a control element, an input of the control element of the photovoltaic side distance protection is $\Delta Z_0$, where $\Delta Z_0$ is equal to the variation of the measured zero sequence impedance at the photovoltaic side protection position before and after the circuit breaker on the power grid side trips or before and after the external line of the photovoltaic station output transmission line trips. Assuming that $Z_0$ is the measured zero sequence impedance at the photovoltaic side protection position after the ground fault happens and before the circuit breaker on the power grid side trips or the external line of the photovoltaic station output transmission line trips, and $Z'_0$ is the measured zero sequence impedance at the photovoltaic side protection position after the circuit breaker on the power grid side trips or after a circuit breaker on the external line of the photovoltaic station output transmission line trips, the input of the control element of the photovoltaic side distance protection is $\Delta Z_0=Z'_0-Z_0$.

In condition that $\Delta Z_0<\Delta Z_{0,set}$, the photovoltaic side distance protection is started, and the control element of the photovoltaic side distance protection controls a circuit breaker to trip.

In condition that $\Delta Z_0>\Delta Z_{0,set}$, the photovoltaic side distance protection is not started.

A detailed analysis of the variation of the measured zero sequence impedance is described below.

$$\Delta Z_0<\Delta Z_{0,set} \tag{1}$$

Figure 2:
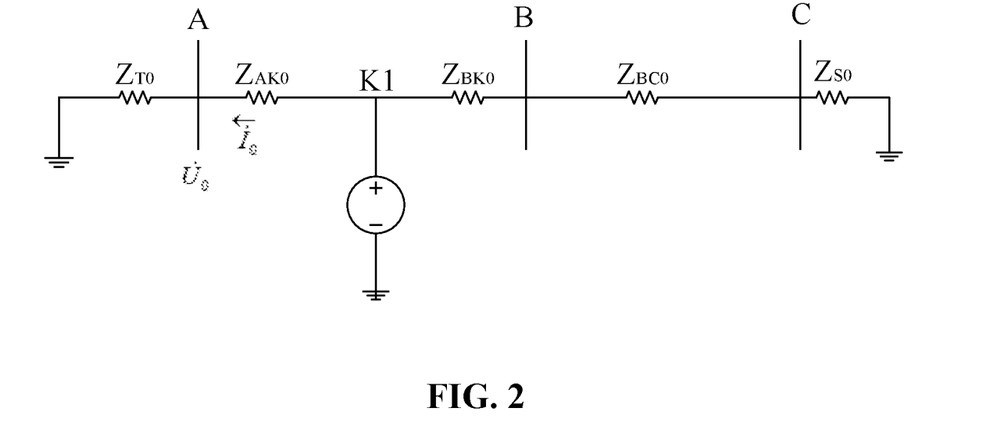
FIG. 2 is a zero sequence network diagram of a power distribution network before a circuit breaker on a power grid side trips in response to K1 fault.

As shown in FIG. 1, a single-phase ground short-circuit fault happens to a point K1 inside the photovoltaic station output transmission line AB, and a zero sequence network is shown in FIG. 2.

The measured zero sequence impedance at the photovoltaic side protection position, that is, a protection position 1 (directions from a bus A and a bus B to a line fault both are a positive direction of a measured current) is:

$$Z_0=\frac{\dot{U}_0}{\dot{I}_0}=-Z_{T0},$$

where $\dot{U}_0$ denotes a voltage across the photovoltaic side protection position, $\dot{I}_0$ denotes a current through the photovoltaic side protection position, and $Z_{T0}$ denotes equivalent impedance between the bus A and a ground line.

Figure 3:
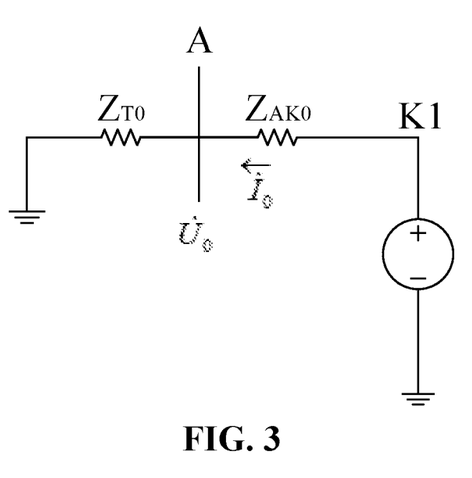
FIG. 3 is a zero sequence network diagram of a power distribution network after a circuit breaker on a power grid side trips in response to K1 fault.

After the circuit breaker on the power grid side (a protection position 2) trips, the zero sequence network is shown in FIG. 3.

The measured zero sequence impedance at the protection position 1 is:

$$Z'_0=\frac{\dot{U}'_0}{\dot{I}'_0}=-Z_{T0},$$

where $\dot{U}'_0$ denotes a voltage across the photovoltaic side protection position after the circuit breaker on the power grid side trips, $\dot{I}'_0$ denotes a current through the photovoltaic side protection position after the circuit breaker on the power grid side trips, and $Z_{T0}$ denotes the equivalent impedance between the bus A and the ground line.

The variation of the measured zero sequence impedance is: $\Delta Z_0=Z'_0-Z_0=0<\Delta Z_{0,set}$.

In condition that the operation condition of the protection position 1 is satisfied, the photovoltaic side distance protection is started, and the control element of the photovoltaic side distance protection controls the circuit breaker to trip.

$$\Delta Z_0>\Delta Z_{0,set} \tag{2}$$

Figure 4:
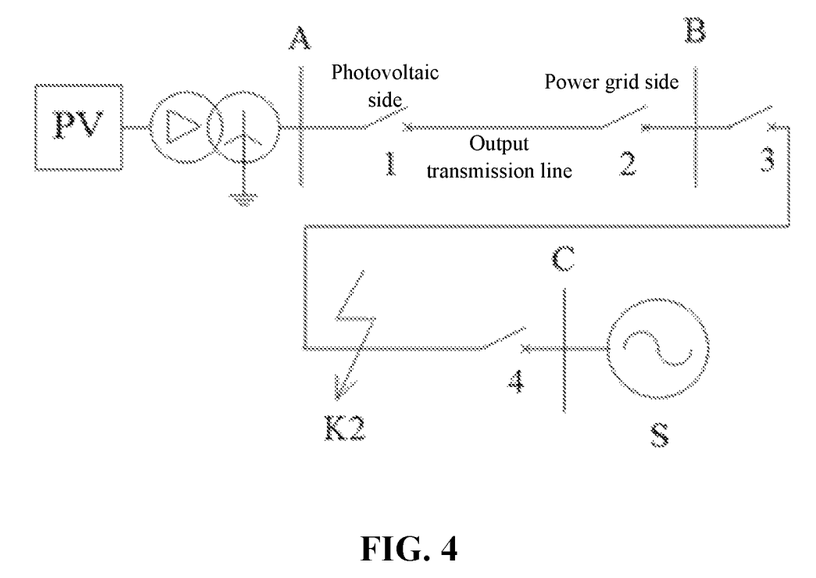
FIG. 4 is a schematic diagram of a line BC with a single-phase ground fault.
Figure 5:
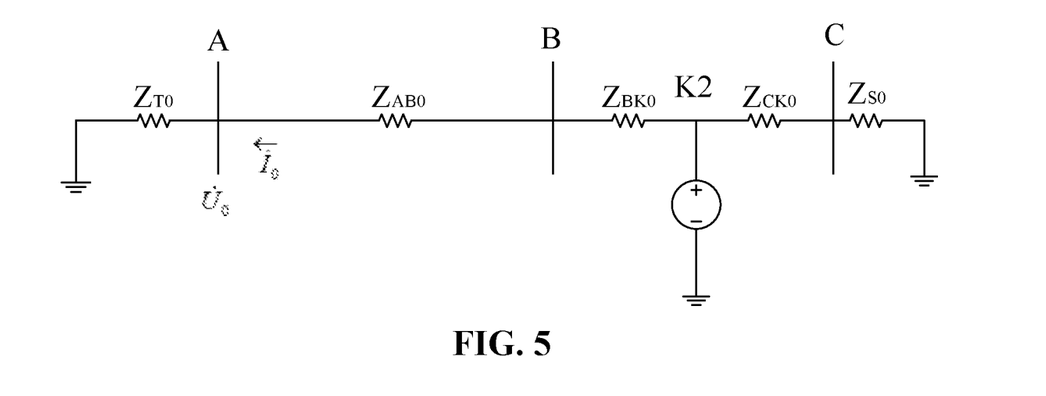
FIG. 5 is a zero sequence network diagram of a power distribution network before a circuit breaker on a power grid side trips in response to K2 fault.

As shown in FIG. 4, the single-phase ground short-circuit fault happens to a point K2 on the external line BC of the photovoltaic station output transmission line, and the zero sequence network is shown in FIG. 5.

The measured zero sequence impedance at the protection position 1 (the direction from the bus A to the line fault is the positive direction of the measured current) is:

$$Z_0 = \frac{\dot{U}_0}{\dot{I}_0} = -Z_{T0},$$

where $\dot{U}_0$ denotes the voltage across the photovoltaic side protection position, $\dot{I}_0$ denotes the current through the photovoltaic side protection position, and $Z_{T0}$ denotes the equivalent impedance between the bus A and the ground line.

Since distance protection (protection 3) for the external line BC of the photovoltaic station output transmission line is started, that is, the circuit breaker on the external line of the photovoltaic station output transmission line trips and the zero sequence network breaks, and therefore a zero sequence voltage and a zero sequence current measured at the protection position 1 both are 0. Therefore, $$Z'_0 = \frac{\dot{U}'_0}{\dot{I}'_0} = \frac{0}{0},$$

where $\dot{U}'_0$ denotes the voltage across the photovoltaic side protection position after the circuit breaker on the external line of the photovoltaic station output transmission line trips, and $\dot{I}'_0$ denotes the current through the photovoltaic side protection position after the circuit breaker on the external line of the photovoltaic station output transmission line trips.

A denominator of the measured zero sequence impedance is zero, and the fraction has no meaning. $Z'_0$ may be configured as infinite. Therefore, the variation of the measured zero sequence impedance is: $\Delta Z_0 = Z'_0 - Z_0 = \infty > \Delta Z_{0,set}$.

The operation condition of the protection position 1 is not satisfied, and the photovoltaic side distance protection is not started.

(b) Protection Starting Time on the Photovoltaic Side

In an embodiment, the photovoltaic side distance protection should be started after a rapid power grid side distance protection operation, and in condition that the operation condition of the photovoltaic side protection position is satisfied. The rapid power grid side distance protection refers to a distance I on the power grid side (not shown in the figure), and a line between the bus A and the bus B is the photovoltaic station output transmission line, where the photovoltaic station output transmission line is composed of the output transmission line on the photovoltaic side and the output transmission line on the power grid side. For example, the bus B may be taken as a starting point, a line which is 80% of the full length of the line between bus A and the bus B in a direction pointing to the bus A is the distance I (not shown in the figure). A photovoltaic side line exit is a line closer the bus A between the bus A and the bus B, and the distance I has sufficient sensitivity to a fault of the photovoltaic side line exit.

Therefore, $t = t_0 + \Delta t$,
where t denotes the protection starting time on the photovoltaic side, $t_0$ denotes the operation time limit for the power grid side distance protection, and $\Delta t$ denotes a time range of the photovoltaic side distance protection, where $t_0 = 0$ s and $\Delta t$ is set to 0.3 s. $\Delta t$ is inherent time to avoid a breaking fault current of the circuit breaker on the power grid side, ensure full breaking of the circuit breaker on the power grid side, and ensure logical operation time of the control element of the photovoltaic side distance protection. $\Delta t$ is greater than or equal to a sum of full tripping time of the circuit breaker on the power grid side and the logical operation time of the control element of the photovoltaic side distance protection.

In a system simulation model shown in FIG. 1, a system voltage level is 110 kV, a capacity of an equivalent power supply S is 200 MVA, a capacity of a photovoltaic (PV) power supply is 0.5 MVA, line parameters are $Z_1 = 0.0363 + j1.0062$ Ω/km and $Z_0 = 0.380 + j1.328$ Ω/km, and the length of line AB is 80 km.

A setting value for the power grid side distance protection is computed. Through simulations, the impedance $Z_{AB}$ corresponding to the full length of the line AB is $2.904 + j80.496$ Ω.

Therefore, $Z_{set} = 1.5\ Z_{AB} = 4.356 + j120.744$ Ω, and the operation time limit for the power grid side distance protection is $t_0 = 0$ s.

1. For a fault inside the photovoltaic station output transmission line AB, when K1 is taken at different positions, before and after the circuit breaker on the power grid side (the protection position 2) trips, the variation of the measured zero sequence impedance at the protection position 1 is shown in the table below.

| Fault position K1 | $Z_0/\Omega$ | $Z'_0/\Omega$ | $\Delta Z_0 = Z'_0 - Z_0/\Omega$ |
|---|---|---|---|
| 0 km from the bus A | 12.1∠89.9° | 12.1∠89.9° | 0 |
| 40 km from the bus A | 12.1∠89.9° | 12.1∠89.9° | 0 |
| 80 km from the bus A | 12.1∠89.9° | 12.1∠89.9° | 0 |

2. Referring to FIG. 4, for a fault of the external line BC of the photovoltaic station output transmission line, taking K2 as an example, before and after the circuit breaker at protection position 3 trips, the variation of the measured zero sequence impedance at the protection position 1 is shown in the table below.

| Fault position K2 | $Z_0/\Omega$ | $Z'_0/\Omega$ | $\Delta Z_0 = Z'_0 - Z_0/\Omega$ |
|---|---|---|---|
| 90 km from the bus A | 12.1∠89.9° | Infinite | Infinite |

It may be seen from the above table that after the fault happens inside the photovoltaic station output transmission line, the measured zero sequence impedance at the protection position 1 remains unchanged before and after the circuit breaker at the protection position 2 trips, the variation of the measured zero sequence impedance $\Delta Z_0$ is less than 10% $Z_0$, the operation condition of the protection position 1 is satisfied, and the control element of distance protection at the protection position 1 controls the circuit breaker on the photovoltaic side to trip; after the fault happens outside the photovoltaic station output transmission line, the variation of the measured zero sequence impedance at the protection position 1 is infinite, the operation condition of the protection position 1 is not satisfied, and the photovoltaic side distance protection is not started.

The new protection method for dealing with the fault of the photovoltaic station output transmission line provided by the present application avoids a situation that photovoltaic side distance protection is affected by a weak feedback of a photovoltaic power supply in the related art. The variation of the measured zero sequence impedance at the photovoltaic side protection position is compared with the setting value, and an output result is configured as a tripping signal to control a photovoltaic side protection operation. In conclusion, a protection setting method based on the measured zero sequence impedance can effectively eliminate the fault inside the photovoltaic station output transmission line without being affected by a transition resistance. The present application has important practical engineering significance for improving the reliability and selectivity of line protection for a photovoltaic integrated power distribution network.

The present application further provides a ground fault protection apparatus for a photovoltaic station output transmission line, where the photovoltaic station output transmission line includes an output transmission line on a power grid side and an output transmission line on a photovoltaic side. The apparatus includes a first control element, a second control element, a first circuit breaker and a second circuit breaker. The first circuit breaker is disposed on the photovoltaic side, the second circuit breaker is disposed on the power grid side, the first control element is electrically connected to the first circuit breaker, and the second control element is electrically connected to the second circuit breaker.

The second control element is configured to configure setting impedance and an operation time limit on the power grid side, and in condition that a ground fault happens to the photovoltaic station output transmission line, start power grid side distance protection. The first control element is configured to perform a setting process on the photovoltaic side according to a setting value of a variation of measured zero sequence impedance, determine whether an operation condition of a photovoltaic side protection position is satisfied, determine whether to start photovoltaic side distance protection, and adjust protection starting time on the photovoltaic side.

The first circuit breaker is configured to trip in condition that the photovoltaic side distance protection is started.

The second circuit breaker is configured to trip in condition that the ground fault happens to the photovoltaic station output transmission line.

In an embodiment, the second control element is configured to perform steps described below.

The setting impedance is configured according to a formula: $Z_{set}=1.5\ Z_{AB}$, where $Z_{AB}$ denotes positive sequence impedance corresponding to a full length of the photovoltaic station output transmission line, and $Z_{set}$ denotes the setting impedance.

The operation time limit is configured according to a formula: $t_0=0$ s, where $t_0$ denotes the operation time limit for the power grid side distance protection.

In an embodiment, the first control element is configured to perform a step described below.

The setting value of the variation of the measured zero sequence impedance is configured according to a formula: $\Delta Z_{0,set}=10\%\ Z_0$, where $Z_0$ denotes the measured zero sequence impedance at the photovoltaic side protection position, and $\Delta Z_{0,set}$ denotes the setting value of the variation of the measured zero sequence impedance.

In an embodiment, the first control element is further configured to perform a step described below.

An input of the first control element is computed according to a formula: $\Delta Z_0=Z'_0-Z_0$, where $\Delta Z_0$ denotes the input of the first control element, $Z'_0$ denotes the measured zero sequence impedance at the photovoltaic side protection position after the second circuit breaker trips or after a circuit breaker on an external line of the photovoltaic station output transmission line trips, and $Z_0$ denotes the measured zero sequence impedance at the photovoltaic side protection position after the ground fault happens and before the second circuit breaker trips or the external line of the photovoltaic station output transmission line trips.

In condition that $\Delta Z_0 < \Delta Z_{0,set}$, the photovoltaic side distance protection is started, and the first control element controls the first circuit breaker to trip.

In condition that $\Delta Z_0 > \Delta Z_{0,set}$, the photovoltaic side distance protection is not started.

In an embodiment, the first control element is further configured to perform a step described below.

The protection starting time on the photovoltaic side is configured according to a formula:

$$t=t_0+\Delta t;$$

where t denotes the protection starting time on the photovoltaic side, $t_0$ denotes the operation time limit for the power grid side distance protection, $\Delta t$ denotes a time range of the photovoltaic side distance protection, where $t_0=0$ s and $\Delta t=0.3$ s.

What is claimed is:

1. A ground fault protection method for a photovoltaic station output transmission line, wherein the photovoltaic station output transmission line comprises an output transmission line on a power grid side and an output transmission line on a photovoltaic side, and wherein the method comprises:
   configuring setting impedance and an operation time limit on the power grid side, and in condition that a ground fault happens to the photovoltaic station output transmission line, starting power grid side distance protection; and
   performing a setting process on the photovoltaic side according to a setting value of a variation of measured zero sequence impedance, configuring protection starting time on the photovoltaic side, determining whether an operation condition of a photovoltaic side protection position is satisfied, and determining whether to start photovoltaic side distance protection.

2. The method of claim 1, wherein the configuring the setting impedance and the operation time limit on the power grid side comprises:
   configuring the setting impedance according to a formula: $Z_{set}=1.5\ Z_{AB}$,
   wherein $Z_{AB}$ denotes positive sequence impedance corresponding to a full length of the photovoltaic station output transmission line, and $Z_{set}$ denotes the setting impedance; and
   configuring the operation time limit according to a formula: $t_0=0$ s,
   wherein $t_0$ denotes the operation time limit for the power grid side distance protection.

3. The method of claim 1, wherein the performing the setting process on the photovoltaic side according to the setting value of the variation of the measured zero sequence impedance comprises:
   configuring the setting value of the variation of the measured zero sequence impedance according to a formula: $\Delta Z_{0,set}=10\%\ Z_0$,
   wherein $Z_0$ denotes the measured zero sequence impedance at the photovoltaic side protection position after the ground fault happens and before a circuit breaker on the power grid side or an external line of the photovoltaic station output transmission line trips, and $\Delta Z_{0,set}$ denotes the setting value of the variation of the measured zero sequence impedance.

4. The method of claim 3, wherein the determining whether the operation condition of the photovoltaic side protection position is satisfied, and determining whether to start the photovoltaic side distance protection comprises:

computing an input of a control element of the photovoltaic side distance protection according to a formula: $\Delta Z_0 = Z'_0 - Z_0$, wherein $\Delta Z_0$ denotes the input of the control element of the photovoltaic side distance protection, $Z'_0$ denotes the measured zero sequence impedance at the photovoltaic side protection position after the circuit breaker on the power grid side trips or after a circuit breaker on the external line of the photovoltaic station output transmission line trips, and $Z_0$ denotes the measured zero sequence impedance at the photovoltaic side protection position after the ground fault happens and before the circuit breaker on the power grid side trips or the external line of the photovoltaic station output transmission line trips;

in condition that $\Delta Z_0 < \Delta Z_{0,set}$, starting the photovoltaic side distance protection, and controlling, by the control element of the photovoltaic side distance protection, the circuit breaker to trip; and in condition that $\Delta Z_0 > \Delta Z_{0,set}$, not starting the photovoltaic side distance protection.

5. The method of claim 1, wherein the configuring the protection starting time on the photovoltaic side comprises:

configuring the protection starting time on the photovoltaic side according to a formula: $t = t_0 + \Delta t$;

wherein t denotes the protection starting time on the photovoltaic side, $t_0$ denotes the operation time limit for the power grid side distance protection, and $\Delta t$ denotes a time range of the photovoltaic side distance protection, wherein $t_0 = 0$ s and $\Delta t = 0.3$ s.

6. A ground fault protection apparatus for a photovoltaic station output transmission line, wherein the photovoltaic station output transmission line comprises an output transmission line on a power grid side and an output transmission line on a photovoltaic side, and wherein the apparatus comprises a first control element, a second control element, a first circuit breaker and a second circuit breaker; wherein the first circuit breaker is disposed on the photovoltaic side, the second circuit breaker is disposed on the power grid side, the first control element is electrically connected to the first circuit breaker, and the second control element is electrically connected to the second circuit breaker;

the second control element is configured to configure setting impedance and an operation time limit on the power grid side, and in condition that a ground fault happens to the photovoltaic station output transmission line, start power grid side distance protection;

the first control element is configured to perform a setting process on the photovoltaic side according to a setting value of a variation of measured zero sequence impedance, determine whether an operation condition of a photovoltaic side protection position is satisfied, determine whether to start photovoltaic side distance protection, and adjust protection starting time on the photovoltaic side;

the first circuit breaker is configured to trip in condition that the photovoltaic side distance protection is started; and the second circuit breaker is configured to trip in condition that the ground fault happens to the photovoltaic station output transmission line.

7. The apparatus of claim 6, wherein the second control element is configured to:

configure the setting impedance according to a formula: $Z_{set} = 1.5 Z_{AB}$, wherein $Z_{AB}$ denotes positive sequence impedance corresponding to a full length of the photovoltaic station output transmission line, and $Z_{set}$ denotes the setting impedance; and configure the operation time limit according to a formula: $t_0 = 0$ s, wherein $t_0$ denotes the operation time limit for the power grid side distance protection.

8. The apparatus of claim 6, wherein the first control element is configured to:

configure the setting value of the variation of the measured zero sequence impedance according to a formula: $\Delta Z_{0,set} = 10\% Z_0$, wherein $Z_0$ denotes the measured zero sequence impedance at the photovoltaic side protection position, and $\Delta Z_{0,set}$ denotes the setting value of the variation of the measured zero sequence impedance.

9. The apparatus of claim 8, wherein the first control element is configured to:

compute an input of the first control element according to a formula: $\Delta Z_0 = Z'_0 - Z_0$, wherein $\Delta Z_0$ denotes the input of the first control element, $Z'_0$ denotes the measured zero sequence impedance at the photovoltaic side protection position after the second circuit breaker trips or after a circuit breaker on an external line of the photovoltaic station output transmission line trips, and $Z_0$ denotes the measured zero sequence impedance at the photovoltaic side protection position after the ground fault happens and before the second circuit breaker or the external line of the photovoltaic station output transmission line trips;

in condition that $\Delta Z_0 < \Delta Z_{0,set}$, start the photovoltaic side distance protection, and control the first circuit breaker to trip; and in condition that $\Delta Z_0 > \Delta Z_{0,set}$, not start the photovoltaic side distance protection.

10. The apparatus of claim 6, wherein the first control element is configured to:

configure the protection starting time on the photovoltaic side according to a formula: $t = t_0 + \Delta t$;

wherein t denotes the protection starting time on the photovoltaic side, $t_0$ denotes the operation time limit for the power grid side distance protection, and $\Delta t$ denotes a time range of the photovoltaic side distance protection, wherein $t_0 = 0$ s and $\Delta t = 0.3$ s.

* * * * *